(12) United States Patent
De Angel

(10) Patent No.: US 6,604,120 B1
(45) Date of Patent: Aug. 5, 2003

(54) MULTIPLIER POWER SAVING DESIGN

(75) Inventor: Edwin De Angel, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 752 days.

(21) Appl. No.: 08/923,133

(22) Filed: Sep. 4, 1997

(51) Int. Cl.[7] .............................................. G06F 7/52
(52) U.S. Cl. ...................................... 708/631; 708/628
(58) Field of Search ........................ 364/760.04, 760.03, 364/760.02, 707; 708/631, 630, 629, 628

(56) References Cited

U.S. PATENT DOCUMENTS

| | | | | |
|---|---|---|---|---|
| 4,982,355 A | * | 1/1991 | Nishimura et al. | 364/707 |
| 5,010,510 A | * | 4/1991 | Nishimura et al. | 364/707 |
| 5,128,890 A | * | 7/1992 | Giradeau, Jr. | 364/707 |
| 5,200,912 A | * | 4/1993 | Asghar et al. | 364/707 |
| 5,231,415 A | * | 7/1993 | Hagihara | 364/760.03 |
| 5,333,119 A | * | 7/1994 | Raatz et al. | 364/760.04 |
| 5,734,601 A | * | 3/1998 | Chu | 364/760.03 |
| 5,787,029 A | * | 7/1998 | de Angel | 364/760.04 |

* cited by examiner

*Primary Examiner*—David H. Malzahn
(74) *Attorney, Agent, or Firm*—Steven Lin, Esq.

(57) ABSTRACT

A digital parallel multiplier has encoders for each segmented bit pair of the multiplier input data which select one of 4 coefficients, based on the sum of the bit pair, that are then applied to the multiplicand input data. The addition of the rows of the scaled multiplicand input data is performed with adders with two data inputs (plus carryin). These adders are cascaded such that normally invalid data ripples through the adder before the final result is achieved. By controlling the time power is applied to the adders most of the intermediate states are eliminated.

8 Claims, 21 Drawing Sheets

MULTIPLIER POWER SAVING DESIGN

CROSS-REFERENCE TO RELATED APPLICATIONS

Reference is made to application entitled "SMALL AREA MULTIPLIER," Ser. No. 08/923,893, filed Sep. 4, 1997, now U.S. Pat. No. 6,085,214 and application entitled "MULTIPLIER SIGN EXTENSION," Ser. No. 08/923,132, filed Sep. 4, 1997 now U.S. Pat. No. 6,183,122 which are hereby incorporated by reference.

STATEMENT REGARDING FEDERALLY SPONSORED RESEARCH OR DEVELOPMENT

Not Applicable

TECHNICAL FIELD OF THE INVENTION

The present invention pertains to digital multipliers, and, more particularly, to parallel digital multipliers for multiplying signed numbers.

BACKGROUND OF THE INVENTION

The modified-Booth algorithm (as described, for example, in A. D. Booth, "A Signed Binary Multiplication Technique," Quart. J. Mech. Appl. Math, vol. 4, pt. 2, pp. 236–240, 1951; and in O. L. MarcSorley, "High-Speed Arithmetic in Binary Computers," IRE Proc, vol. 49, pp. 67–91, January 1961) is widely used to implement multiplication in DSP systems and other applications. Although this type of multiplier is not the fastest multiplier design, it does reduce the number of product terms to be added by half when compared to an array multiplier, and also allows a regular layout.

Modified Booth Algorithm

The modified Booth algorithm works essentially as follows: Given two numbers A and B, the algorithm analyzes the multiplier data A (taking three bits at a time) to determine whether to add zero, B, −B, 2B, or −2B based on the entire three bits. Table I shows the operation to be realized according to the three bits being analyzed. $R_i$ is the accumulated result up to the current iteration.

TABLE 1

Modified Booth Algorithm

| $A_{2i+1}$ | $A_{2i}$ | $A_{2i-1}$ | Operation |
|---|---|---|---|
| 0 | 0 | 0 | $R_i = R_{i-1}/4$ |
| 0 | 0 | 1 | $R_i = (R_{i-1} + B)/4$ |
| 0 | 1 | 0 | $R_i = (R_{i-1} + B)/4$ |
| 0 | 1 | 1 | $R_i = (R_{i-1} + 2B)/4$ |
| 1 | 0 | 0 | $R_i = (R_{i-1} - 2B)/4$ |
| 1 | 0 | 1 | $R_i = (R_{i-1} - B)/4$ |
| 1 | 1 | 0 | $R_i = (R_{i-1} - B)/4$ |
| 1 | 1 | 1 | $R_i = R_{i-1}/4$ |

Row 1 and Row 8 of table 1 will be called NOOP (NO OPERATION) since from the algorithm perspective no addition is performed, only a division by 4 (i.e, a shift). For the radix-4 modified Booth algorithm (i.e., analyzing 3 bits at a time with 1 bit of overlap) it can be observed that in comparison with an array multiplier the number of rows is reduced by half. A carry save array is used to add the partial products and a fast adder is used to add the final two words (i.e., carry and sum) producing the final product.

From table 1 it can be observed that the implementation of the modified Booth algorithm requires a 5:1 mux in order to add B, −B, 2B, −2B or zero to the partial product.

A significant improvement can be achieved to reduce the rows of the multiplier if a higher radix is used for the multiplier data (see, for example, H. Sam and A. Gupta, "A Generalized Multibit Recoding of Two's Complement Binary Numbers and Its Proof with Application in Multiplier Implementations," IEEE Transactions on Computers, vol. 39, pp. 1006–1015, 1990). The problem associated with this approach is that term 3B needs to be generated which is very difficult (i.e., time consuming). G. Bewick and M. J. Flynn ("Binary Multiplication Using Partially Redundant Multiples," Stanford University Technical Report, no. CSL-TR-92-528, 1992) propose the use of small adders to generate this term in a partially redundant form. Still this approach adds overhead to the multiplier and breaks the regular structure of the multiplier.

A. Y Kwentus, H. Hung, and A. N. Willson, Jr. ("An Architecture for High Performance/Small Area Multipliers for Use in Digital Filtering Applications," IEEE Journal of Solid-State Circuits, vol. 29, pp. 117–121, 1994) present the architecture of a multiplier where the terms 0, B, 2B, 3B are used. The main advantage of this multiplier is the reduction of the multiplexer from 5:1 (modified-Booth) to 4:1. The main disadvantage is that the 3B term needs to be pre-computed and stored in memory or generated with a fast adder.

TABLE 2

Kwentus Encoding

| $A_{2i+1}$ | $A_{2i}$ | Operation |
|---|---|---|
| 0 | 0 | $R_i = (R_{i-1})/4$ |
| 0 | 1 | $R_i = (R_{i-1} + B)/4$ |
| 1 | 0 | $R_i = (R_{i-1} + 2B)/4$ |
| 1 | 1 | $R_i = (R_{i-1} + 3B)/4$ |

In each of these arrangements, the multiplicands B are replicated one time for each group of two or three multiplier bits (data A), and scaled by the appropriate factor shown above. These scaled mutiplicands must then be added together. In the present art this adding operation is done sequentially with each adder having two data inputs. As a result of this ripple addition, invalid intermediate states are produced in the adders which wastes power.

SUMMARY OF THE INVENTION

In accordance with the invention, a digital multiplier for multiplying multiplier data by multiplicand data to provide a product utilizes a plurality of sequentially powered adders to reduce the number of invalid intermediate states in the adders and thereby save power.

BRIEF DESCRIPTION OF THE DRAWINGS

The aforementioned and other features, characteristics, advantages, and the invention in general will be better understood from the following more detailed description taken in conjunction with the accompanying drawings, in which.

Figure 1:
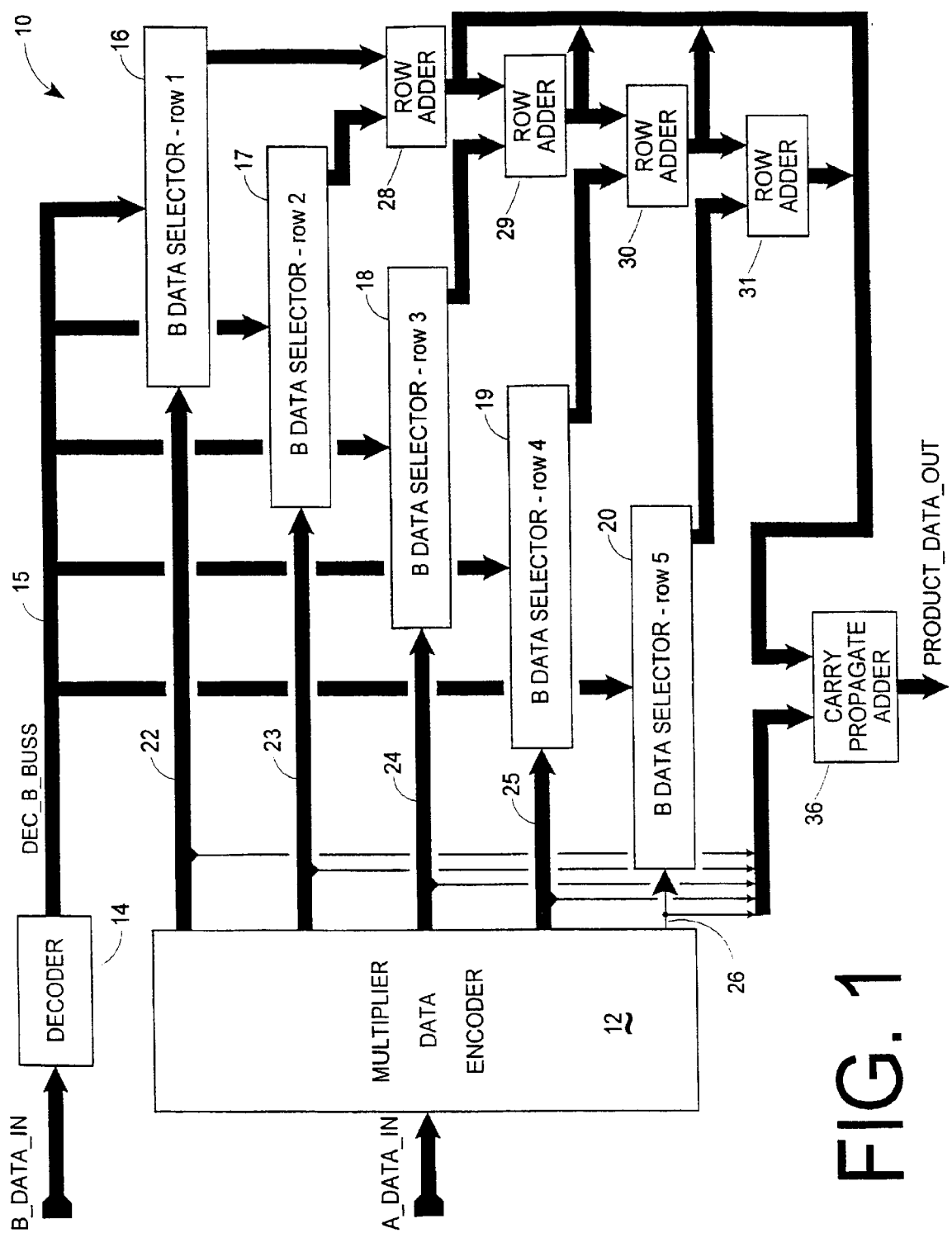
FIG. 1 is a block diagram of a digital multiplier according to the present invention.

It will be appreciated that for purposes of clarity and where deemed appropriate, reference numerals have been repeated in the figures to indicate corresponding features.

DETAILED DESCRIPTION OF THE INVENTION

Referring to FIG. 1, digital multiplier 10 is shown according to the present invention that utilizes a small layout on an integrated circuit chip and offers fast multiplier operations with low power consumption. The A data, which is defined as the multiplier data, is input as an eight bit string shown as signal A_DATA_IN and is input to MULTIPLIER DATA ENCODER 12. The B data, which is the multiplicand data, is input as an eight bit string shown as signal B_DATA_IN and is input to decoder 14. The output of decoder 14 is connected to sixteen bit bus 15, labeled DEC_B_BUS, that transfer the true and complement of the eight B bits to B data selectors 16, 17, 18, and 19 with true data only to data selector 20. MULTIPLIER DATA ENCODER 12 is connected to B DATA selectors 16–19, through buses 22–25 respectively. Single bit bus 26 connects MULTIPLIER DATA ENCODER 12 to B DATA SELECTOR 20.

Output buses from B DATA SELECTORs 16, 17 are added together in ROW ADDER 28. Selected bits of the output of adder 28 are added with the bus output of B DATA SELECTOR 18 by ROW ADDER 29. Selected bits of the output of adder 29 are added with the bus output of B DATA SELECTOR 19 by ROW ADDER 30. Selected bits of the output of adder 30 are added with the bus output of B DATA SELECTOR 20 by ROW ADDER 31. The output of adder 31 and the non-selected output bits of adders 28–30 form one input to carry propagate adder 36, the other input bus of which are the X3 output signals from MULTIPLIER DATA ENCODER 12.

In operation the A data is encoded in MULTIPLIER DATA ENCODER 12 and the output signals from MULTIPLIER DATA ENCODER 12 control B DATA SELECTORS 16–20 to select B true data, B complementary data (on an individual bit basis in the preferred embodiment), 2B true data, or no B data (NOOP). This encoding follows the algorithm shown in Table 3 below. Each of the rows of selected B data is then summed together in adders 28–31. This sum is then added to selected output bits of MULTIPLIER DATA ENCODER 12 in carry propagate adder 36 to form the output product PRODUCT_DATA_OUT, a 16 bit string.

Although the eight bit A data is segmented into only four pairs of bits, a fifth encoder 44 and a fifth B DATA SELECTOR 20 is necessary for sign extension because of the carry operation in encoder 43.

Figure 2A:
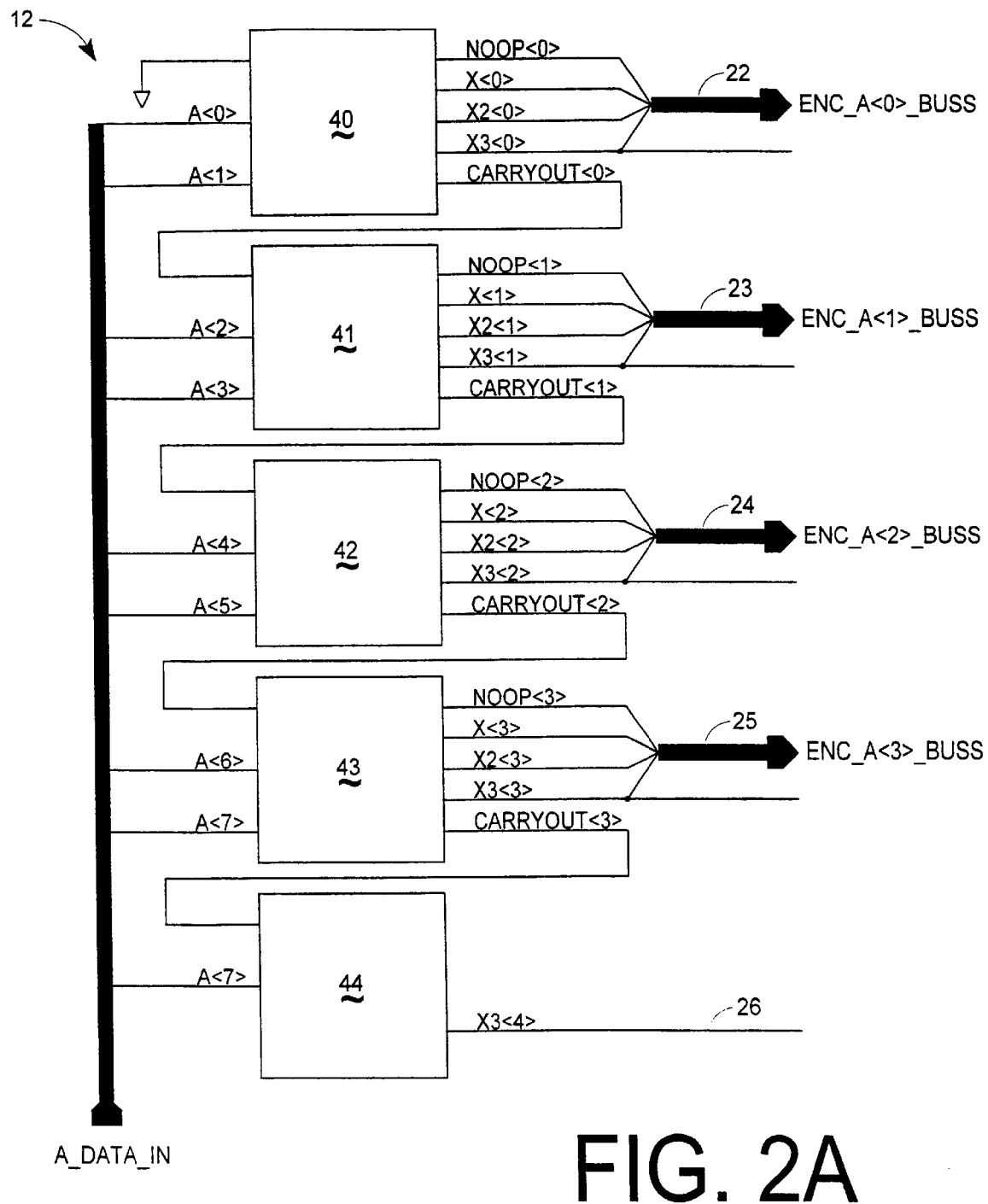
FIG. 2A is a block diagram of the MULTIPLIER DATA ENCODER shown in FIG. 1.

FIG. 2A is a block diagram of the ENCODER 12. There are four full encoders 40–43, and a simplified fifth encoder 44 to handle the carryout signal from the encoder 43. Each of encoders 40–43 have five output signals: NOOP, X, X2, X3, and CARRYOUT. Four of these signals are included on each bus line 22–25 for each encoder 40–43 respectively. There are three input lines to each of the encoders 40–43, one for each of the A data bit pairs, and a carryin signal. Top encoder 40 receives the least significant bit pair of the A data, and its carryin input is grounded. In each of the four remaining encoders, the carryin input is the carryout signal from the previous less significant encoder. Encoder 44 has only a single A data input which is the most significant bit of the A data and the carryin input. Its output is line 26 (X3<4>line).

Figure 6A:
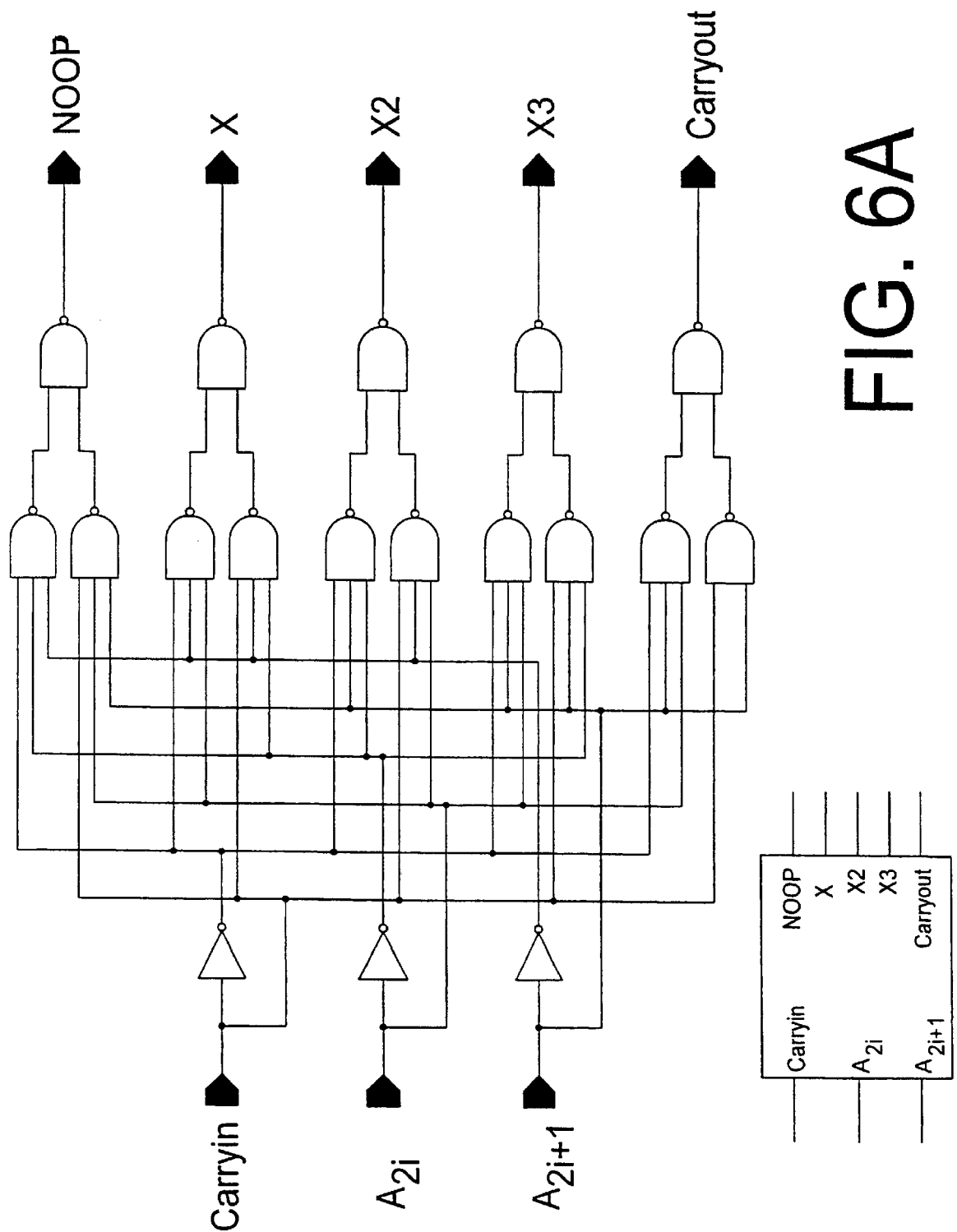
FIGS. 6A, 6B, 6C, and 6D are logic and circuit diagrams of the circuit blocks shown in FIGS. 2A, 3A, 3B, 3C, 3D, 4A, 4B, 5A, and 5B.
Figure 6B:
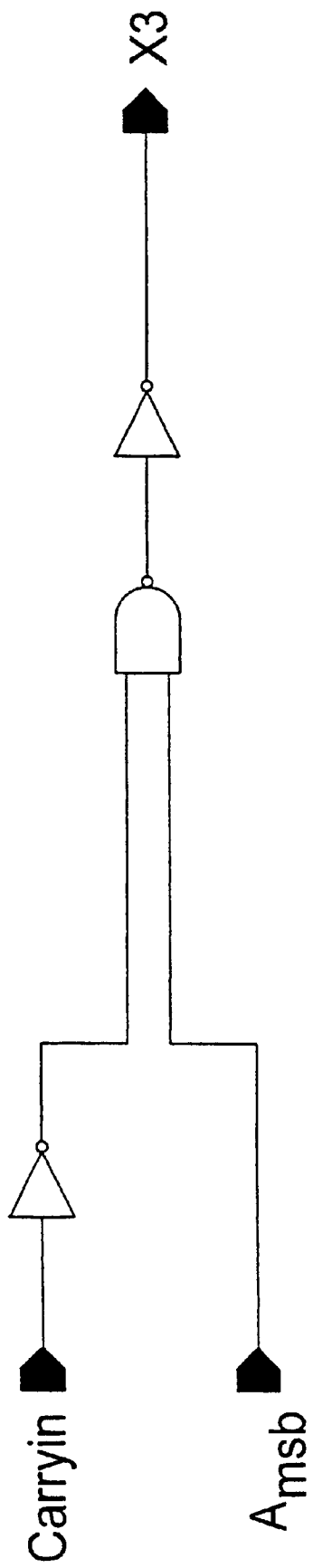
Figure 6B:
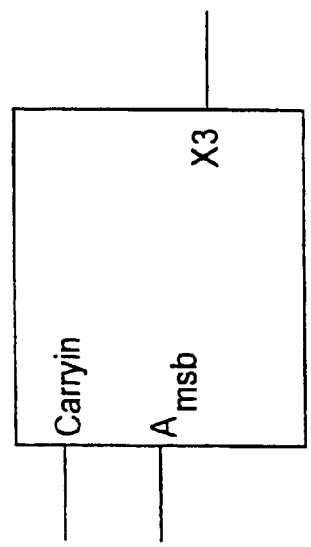

A logic diagram, along with a orientation drawing, of the encoders 40–43 is shown in FIG. 6A. A logic diagram and orientation drawing of encoder 44 is shown in FIG. 6B.

Figure 2B:
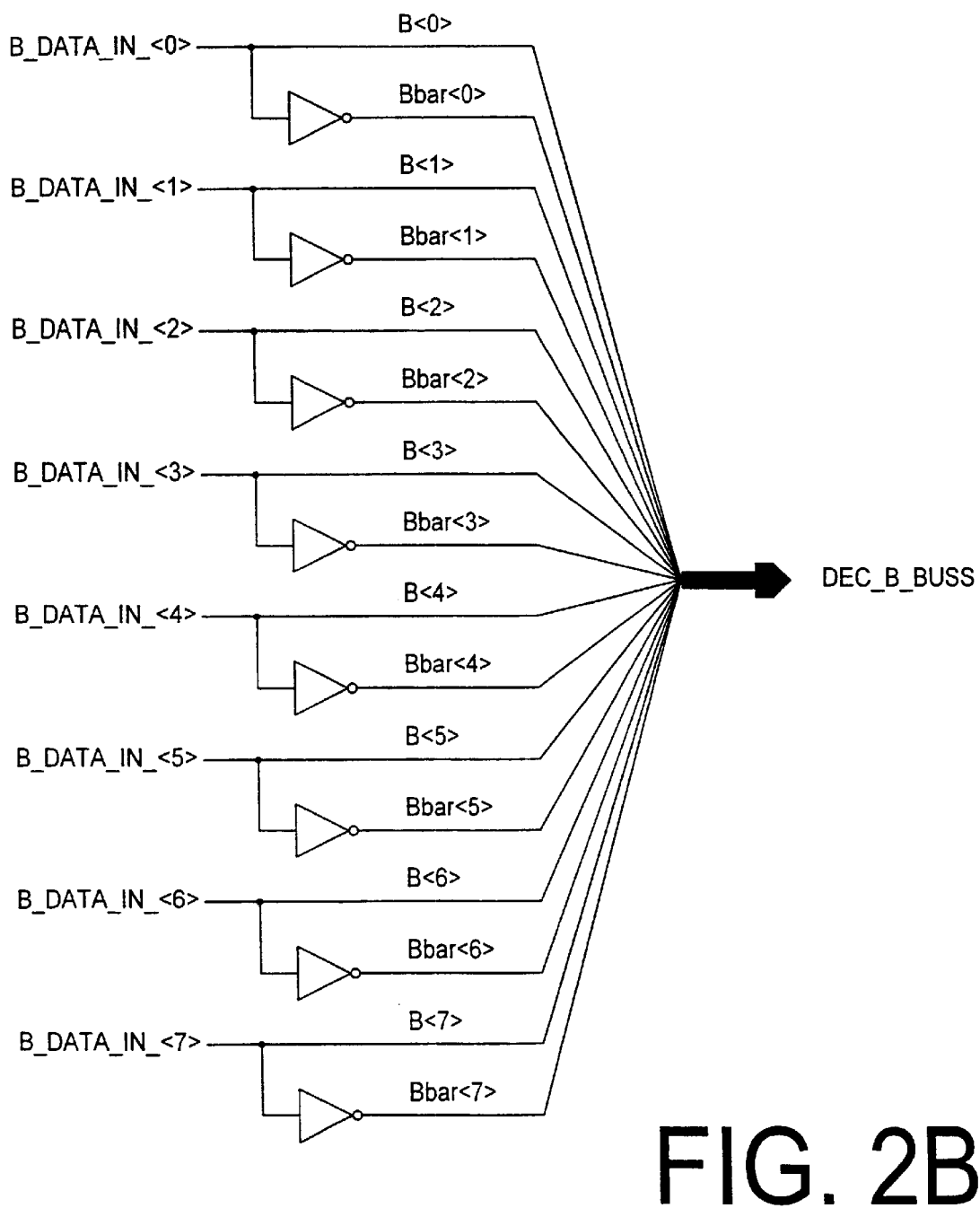
FIG. 2B is a logic diagram of the circuitry to provide the true and complement of the B Data used in FIG. 1.

FIG. 2B is a logic diagram of decoder 14 which provides the true and complementary bit signals of the B data on output bus DEC_B_BUS 15.

Figure 3A:
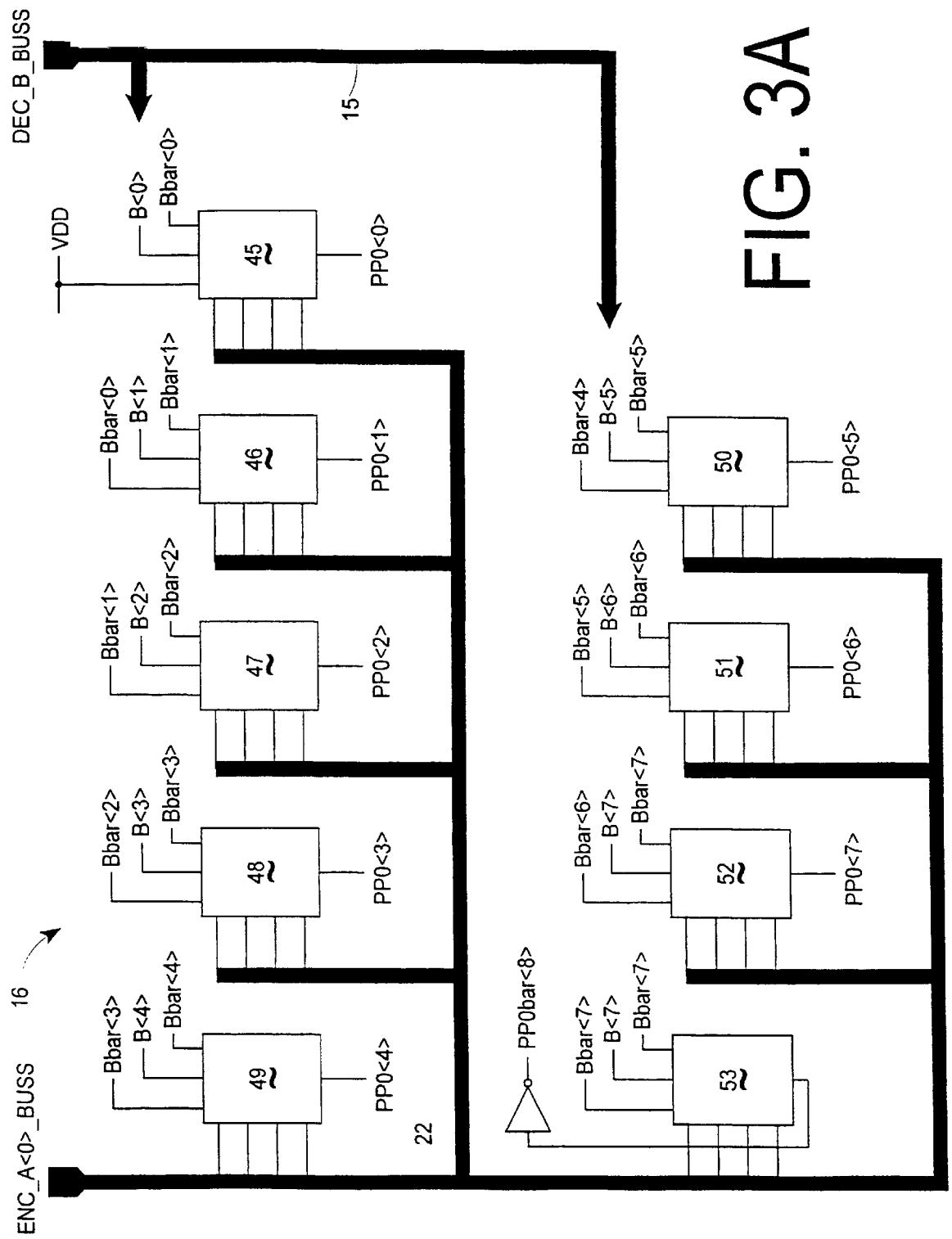
FIGS. 3A, 3B, 3C, 3D, and 3E are block and logic diagrams of the B DATA SELECTOR—row 1, 2, 3, 4, and 5, respectively, shown in FIG. 1.
Figure 3B:
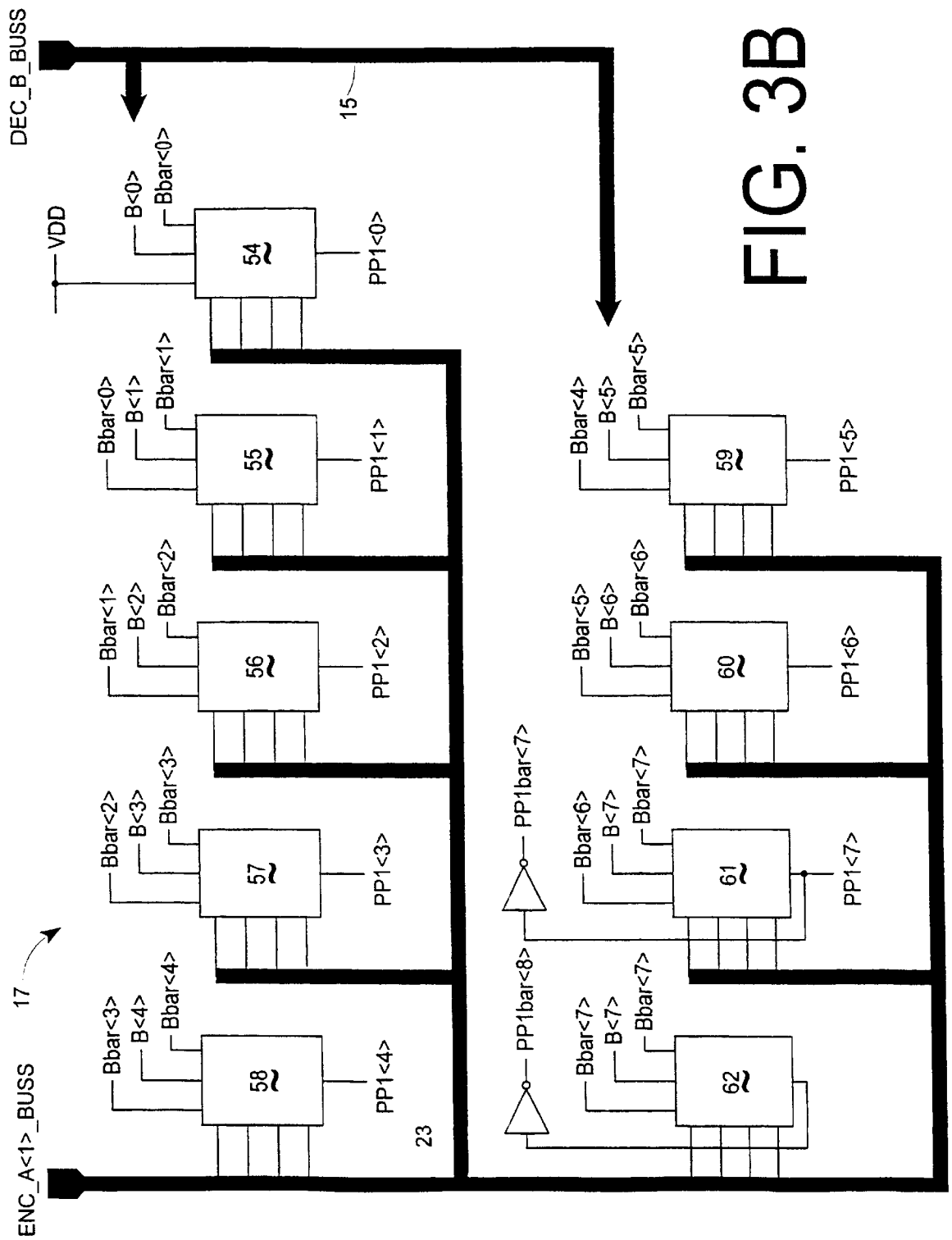
Figure 3C:
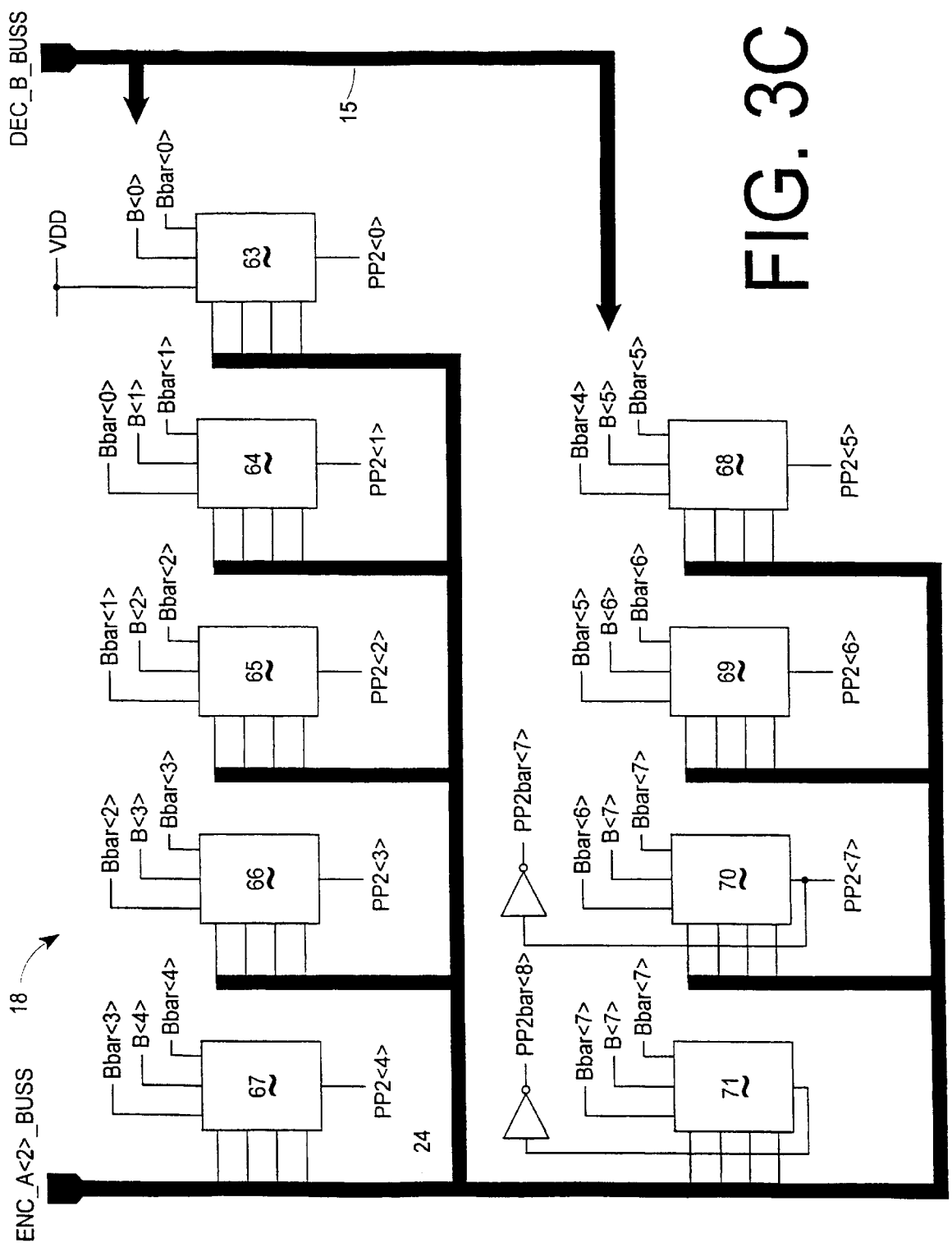
Figure 3D:
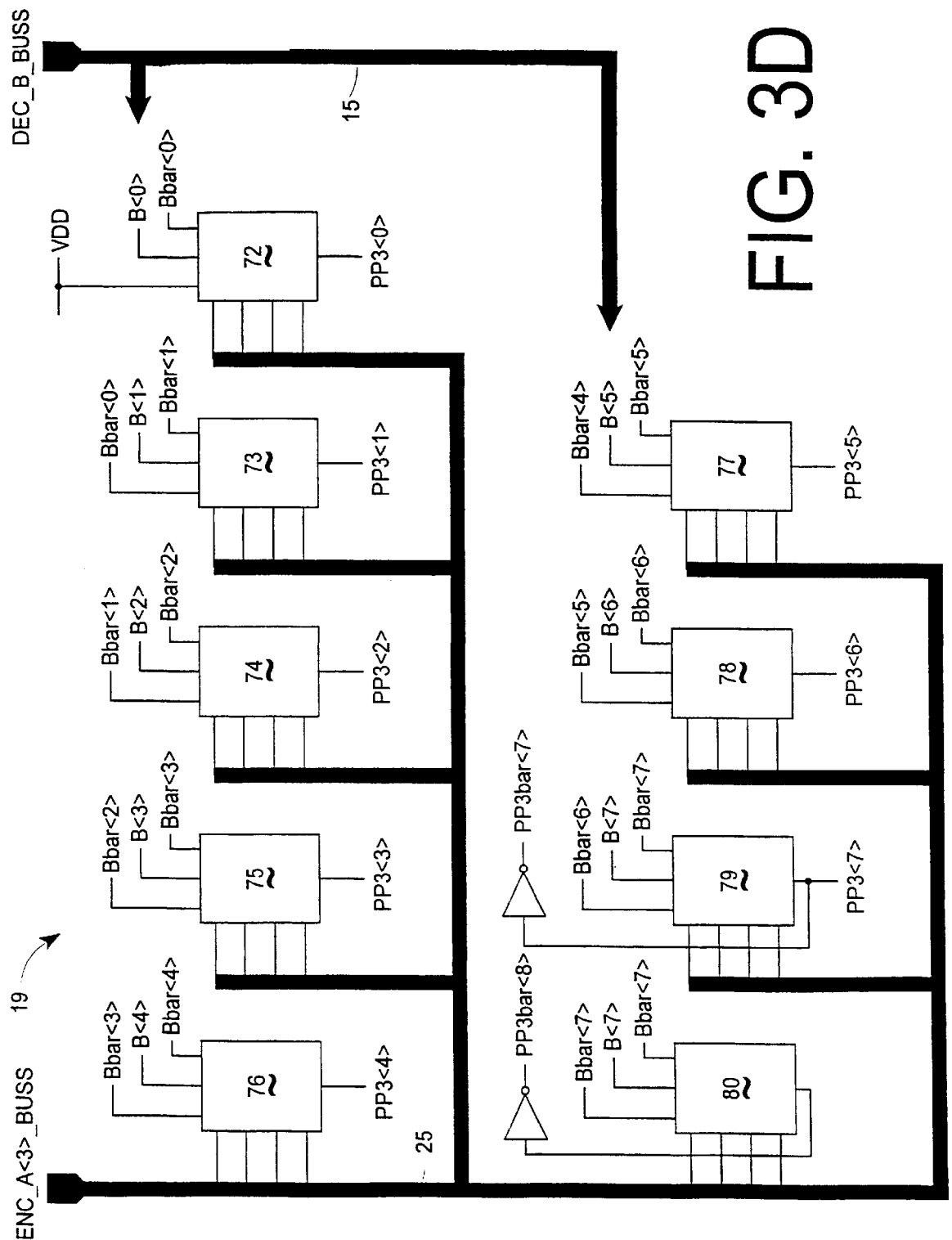
Figure 3E:
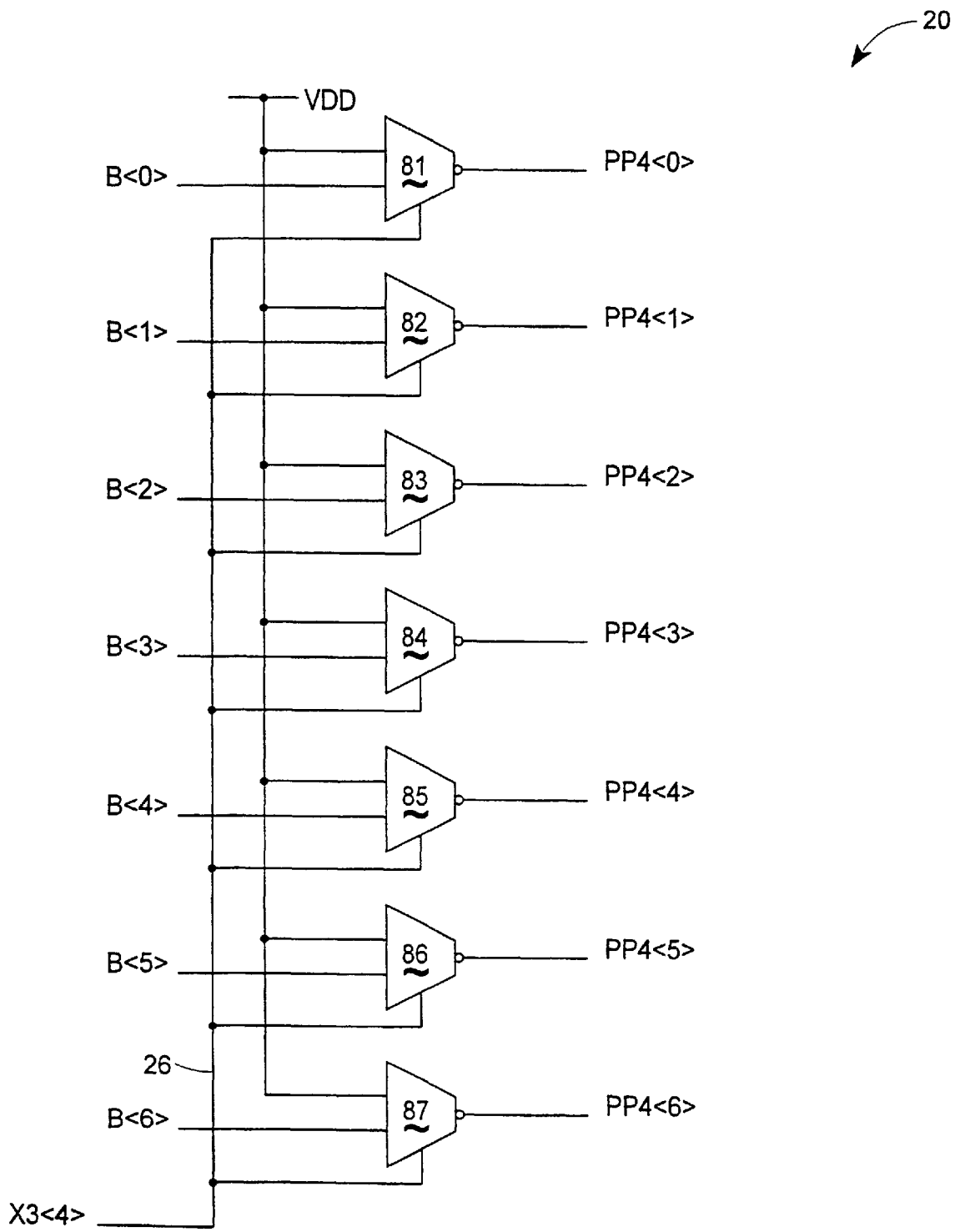
Figure 6C:
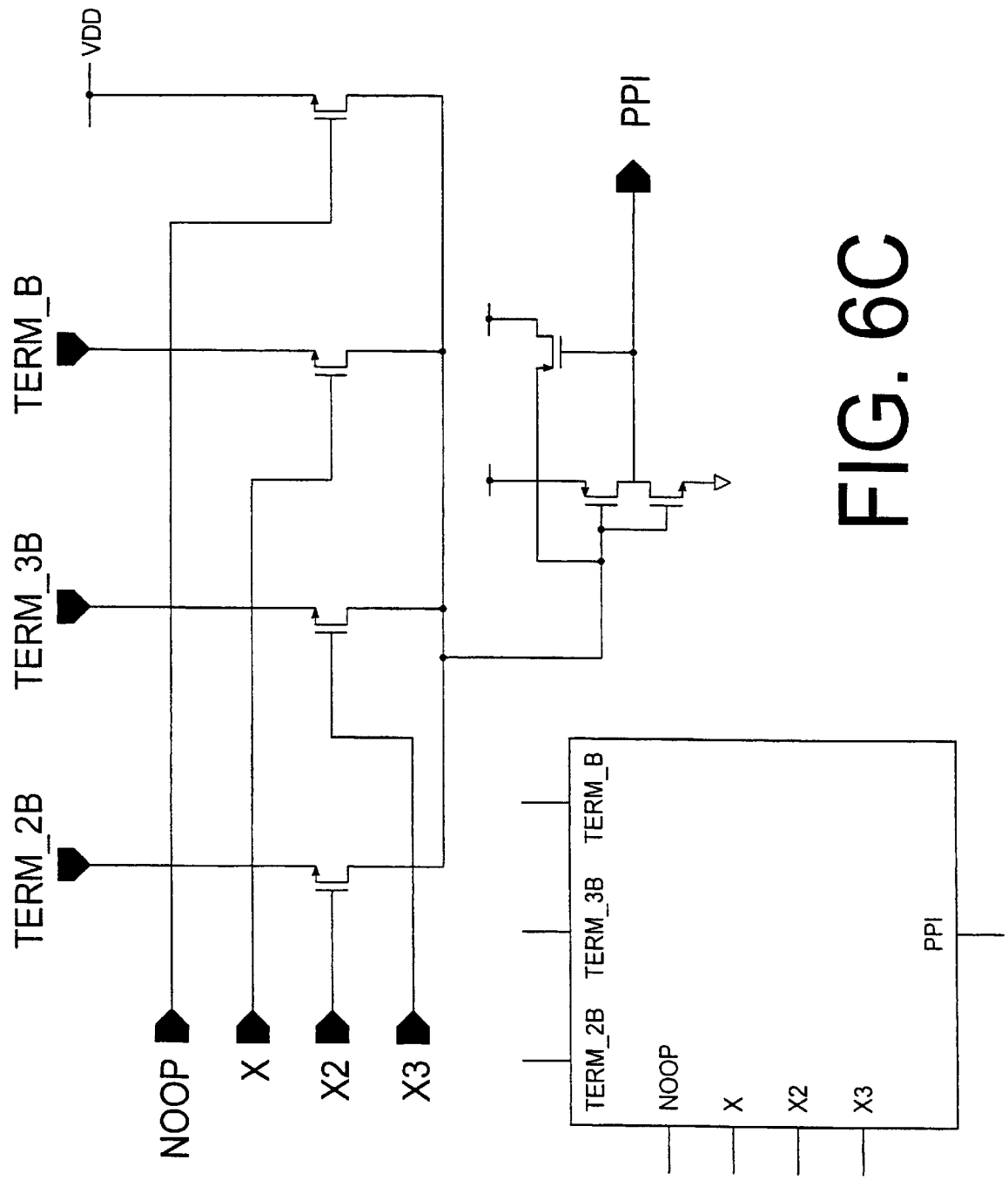

Each of B DATA SELECTION circuits 16–20 are shown in FIGS. 3A, 3B, 3C, and 3D as block diagrams of circuits 16–19, respectively, and in FIG. 3E as a logic diagram for circuit 20. FIG. 3A shows nine individual B data selection circuits 45–53. Each of these individual B data selection circuits 45–53 is controlled by the signals on the ENC_A<0>_BUS and selects one of three B data inputs or ignores the B data. The outputs from each of the circuits 45–52 is part of the data out of the B DATA SELECTOR—row 1. The output from circuit 53 is inverted and forms an additional signal on the data out of the B DATA SELECTOR—row 1. FIG. 6C is circuit diagram and an orientation diagram for each B data selection circuit 45–53. Note that the signals on the input terminals TERM_B, TERM_2B, TERM_3B and VDD are inverted when selected and placed on the output line PPI.

Similarly FIG. 3B is a block diagram of B DATA SELECTOR—row 2, and contains nine individual B data selection circuits 54–62. The circuit diagrams for these circuits are also shown in FIG. 6C. FIGS. 3C and 3D are respective block diagrams for B DATA SELECTOR—row 3 and B DATA SELECTOR—row 4, and each contain nine individual B data selection circuits numbered 63–71 in FIG. 3C and numbered 72–80 in FIG. 3D. The circuit diagrams for these circuits 63–71 and 72–80 are shown in FIG. 6C. The output from circuits 61 and 62 in FIG. 3B, 70 and 71 in FIG. 3C, and 79 and 80 in FIG. 3D, are each inverted to form two additional data out signals.

FIG. 3E is a logic diagram of the selector circuit 20. Since there is only one control line into the data selector of FIG. 3E, the data selection is performed with multiplexers 81–87. When the X3<4> signal is low, each of multiplexers 81–87 selects the VDD input, inverts it and places it on the PP4<0>–PP4<6> lines, respectively. Conversely when the X3<4> signal is high, the B<0>–B<6> lines are selected and inverted and placed on the PP4<0>–PP4<6> lines, respectively.

Figure 4A:
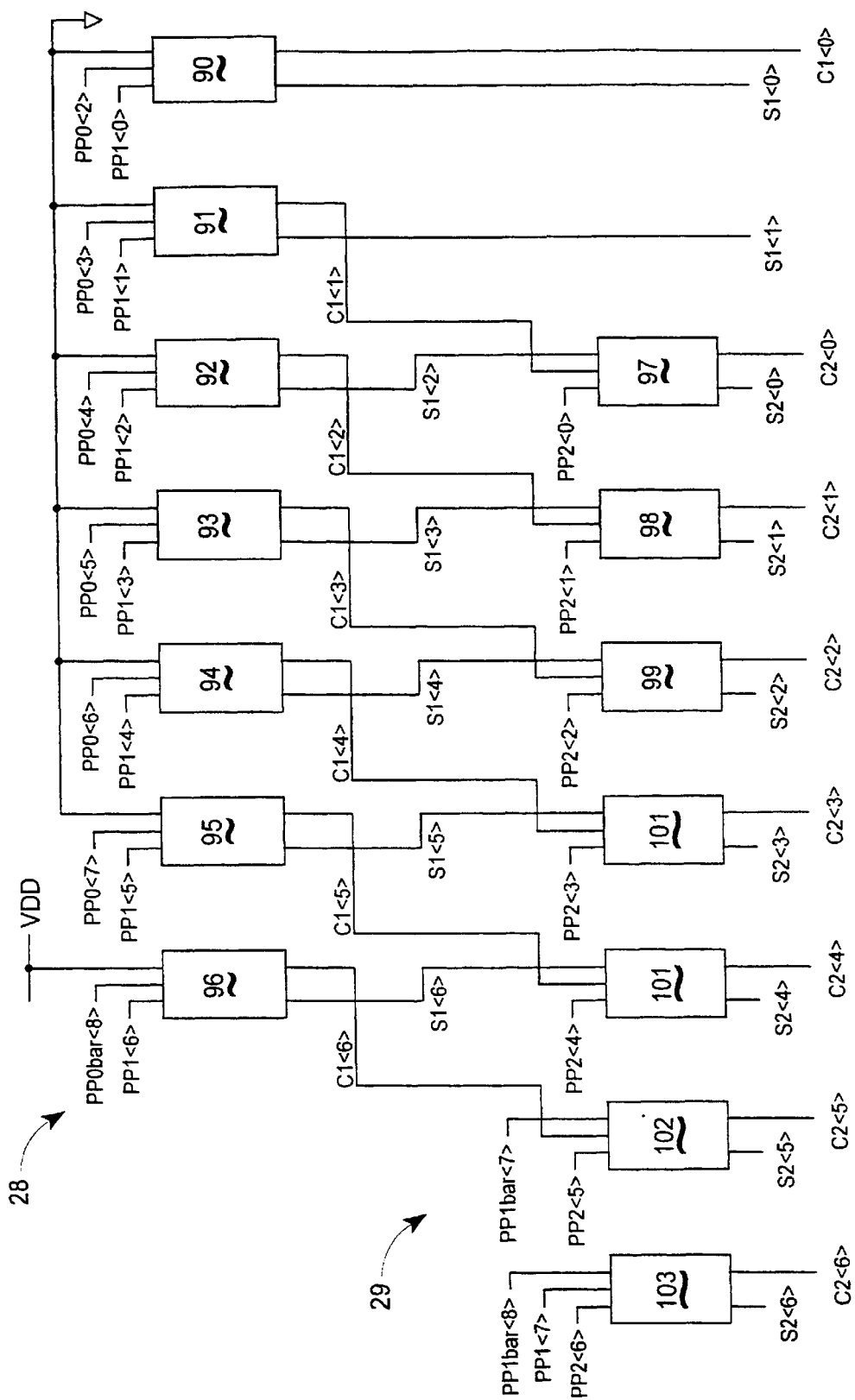
FIGS. 4A and 4B are block diagrams of the ADDER A, B, C, and D shown in FIG. 1.
Figure 4B:
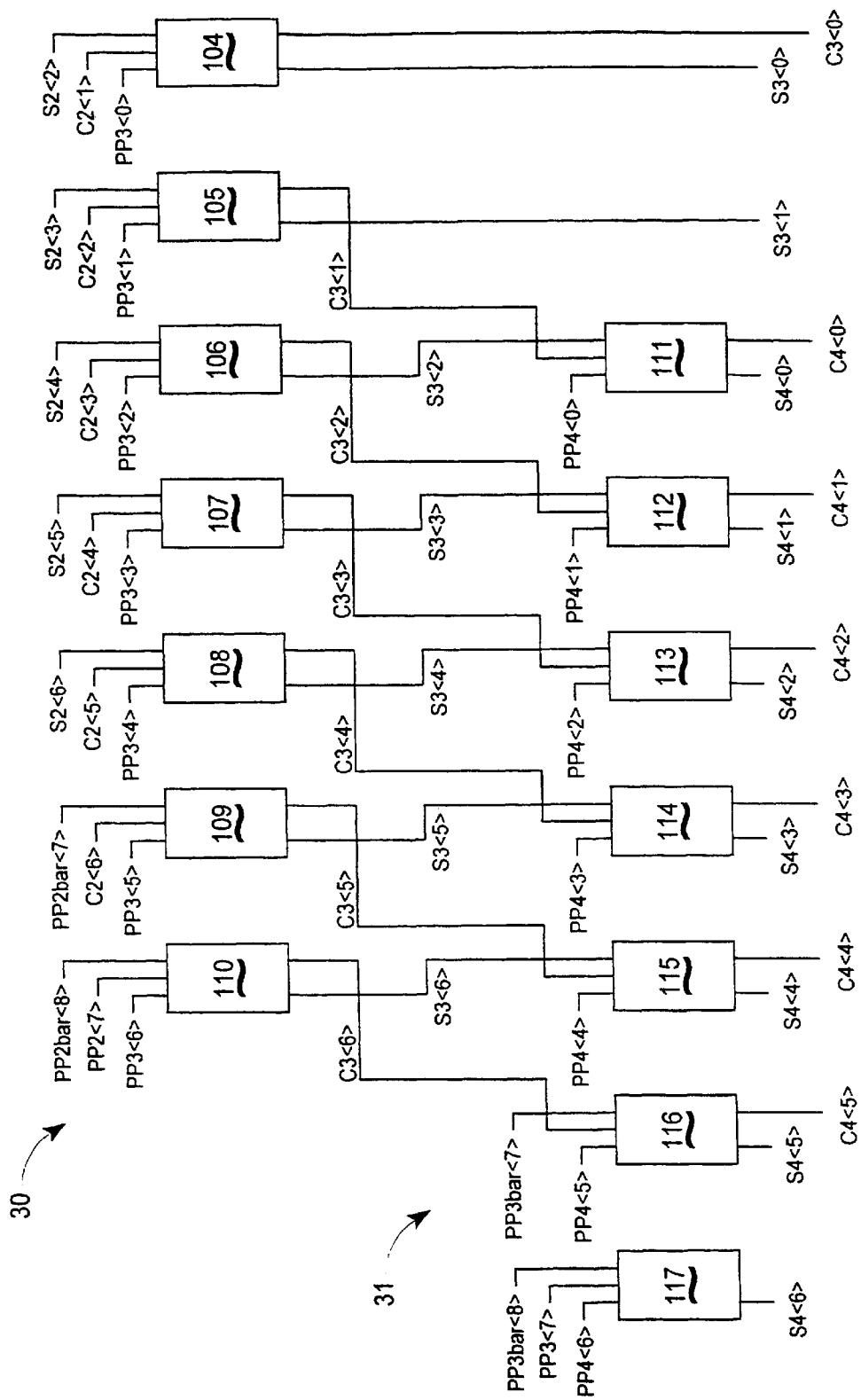

FIGS. 4A and 4B are block diagrams of adder circuits 28–31. Adder circuits 96–111 are shown in detail in FIG. 6D which also shows an orientation drawing of the circuit. The adders in FIGS. 4A and 4B receive the outputs from selector circuits 16–20 and provide an output to CARRY PROPAGATE ADDER 36 shown in FIGS. 5A and 5B.

In FIG. 4A adder circuit 96 has one of its inputs connected to VDD which provides the added logic 1 shown above the top row of Diagram 1: SIGN EXTENSION, shown below. The T bits of Diagram 1 are provided by the PP0bar<8> signal input to adder 96, the PP1bar<8> signal input to adder 103, the PP2bar<8> signal input to adder 110, and the PP3bar<8> signal input to adder 117.

The added logic ones on the left end of each of the rows of Diagram 1 are provided in the following manner: The left most logic 1 for the first or top row of Diagram 1 is included in adder 29 by placing the inverse of PP1<7> onto an input of adder 102, and placing PP1<7> onto an input of adder 103. This arrangement increments PP1<7> by one. Similarly, the left logic 1 for the second row is realized in adder 30 using PP2bar<7> and PP2<7> as inputs to adders 109 and 110, respectively; and the left logic 1 for the third row is realized in adder 31 using PP3bar<7> and PP3<7> as inputs to adders 116 and 117, respectively. Although Diagram 1 shows a logic 1 on the left end of the fourth or bottom row for purposes of generality, this last logic 1 is not needed since the product of two signed numbers, each having 7 data bits plus one sign bit, is 15 data bits and one sign bit. Since the left logic 1 of row four is occupying bit position 16, it is not needed and not generated in the embodiment of FIG. 1.

Figure 5A:
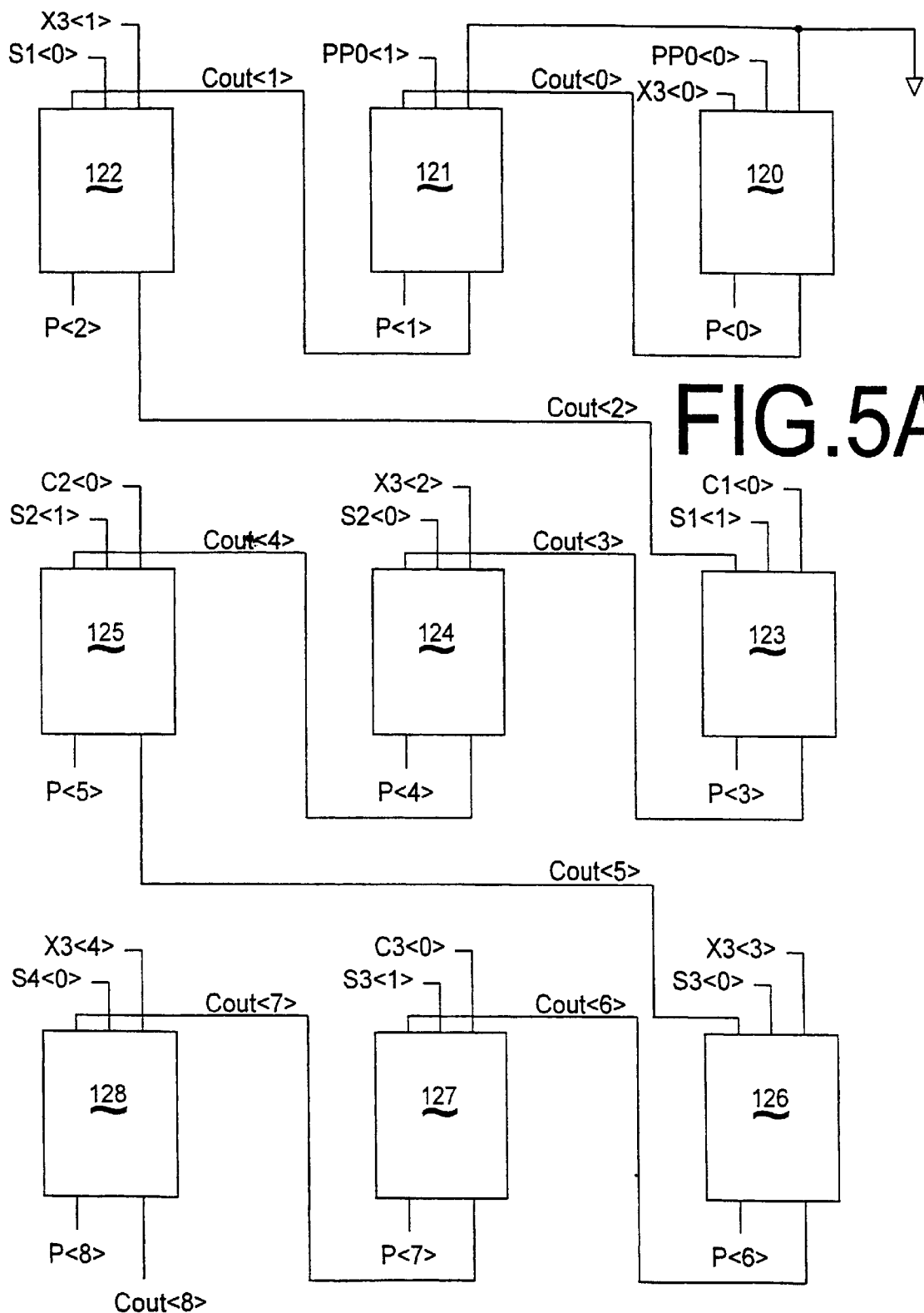
FIGS. 5A and 5B together are a block diagram of the CARRY PROPAGATE ADDER shown in FIG. 1.
Figure 5B:
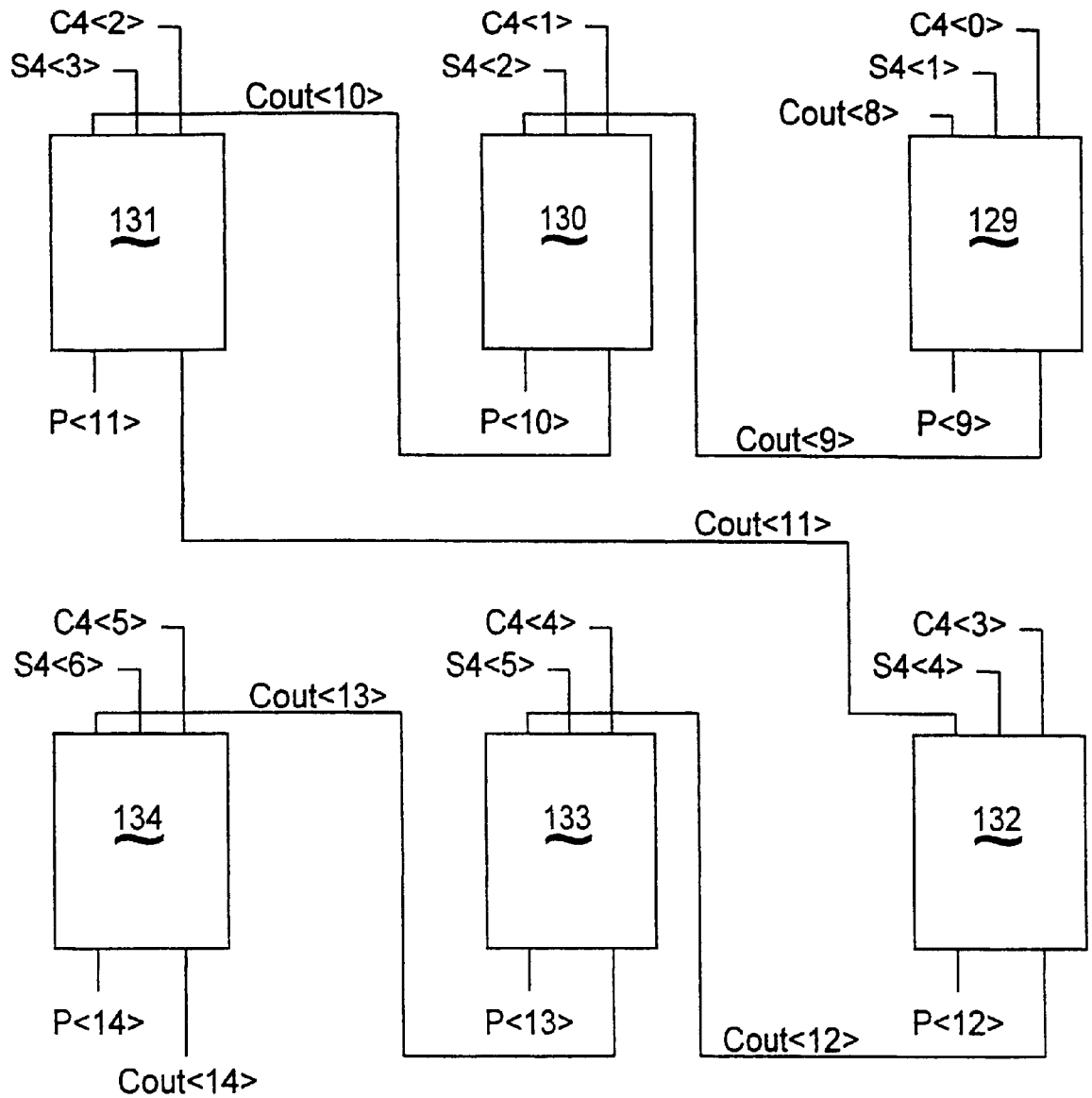
Figure 5B:
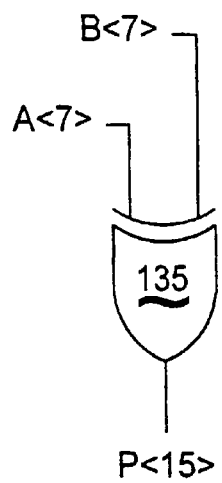
Figure 6D:
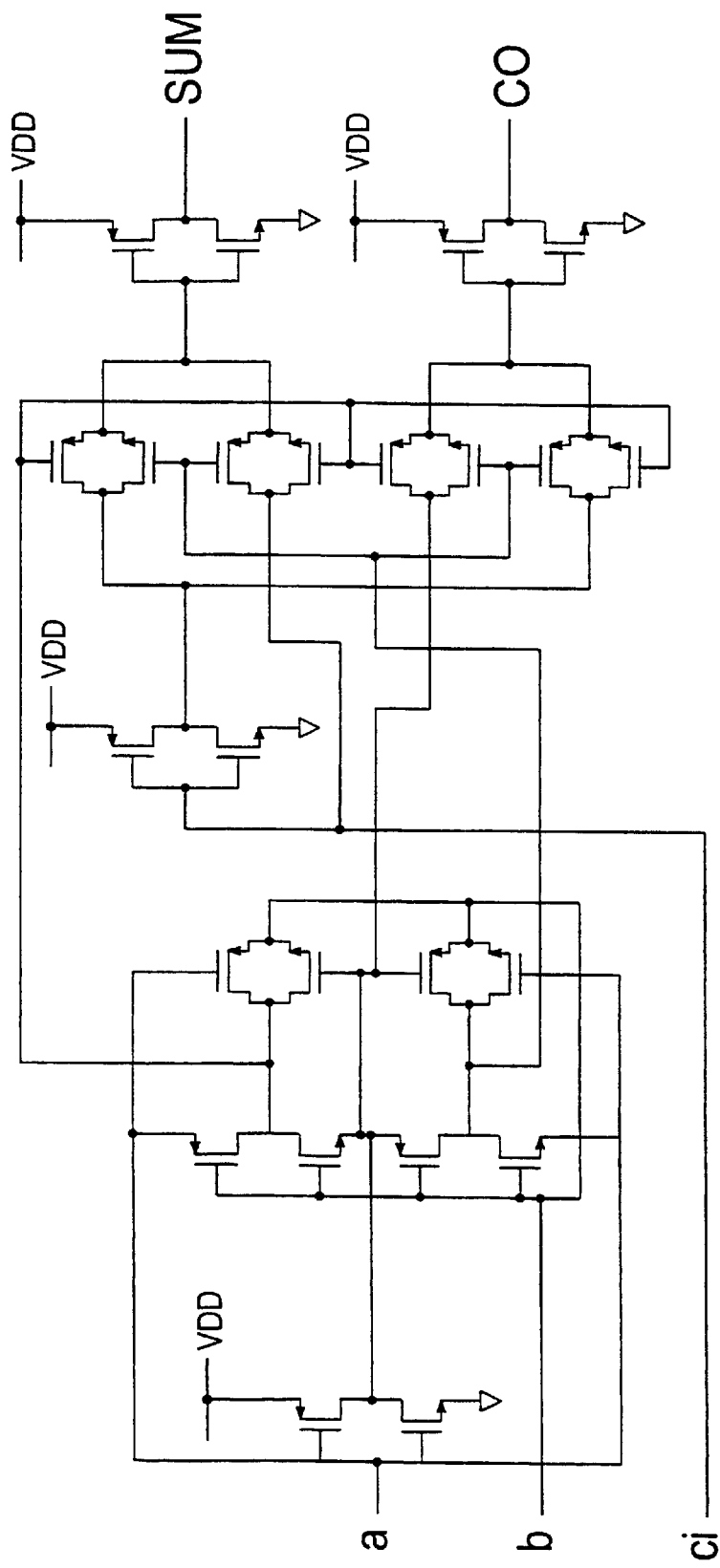
Figure 6D:
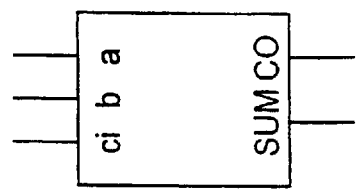

CARRY PROPAGATE ADDER 36 shown in FIGS. 5A and 5B contain adder circuits 120–134 which are also the circuits shown in FIG. 6D, and Exclusive Or gate 136 that provides the sign bit of the product. CARRY PROPAGATE ADDER 36 adds the two least significant bits of adders 28, 30, and 32, to the output of adder 34.

In addition CARRY PROPAGATE ADDER 36 adds a one in the first, third, fifth, and/or seventh least significant bit positions depending on whether X3<0>, X3<1>, X3<2>, X4<3>, and/or X3<4> data lines, respectively, are selected. These additional ones correspond to the D's shown in Diagram 1: SIGN EXTENSION. When an X3 line is selected, a −B is to be placed in the respective B DATA SELECTOR register. However, since −B is two's complement of B and only each of the inverted B bits is placed in the RESPECTIVE B data SELECTOR registers, CARRY PROPAGATE ADDER 36, if necessary, adds a 1 to the bit corresponding to the least significant bit for each register.

Figure 7:
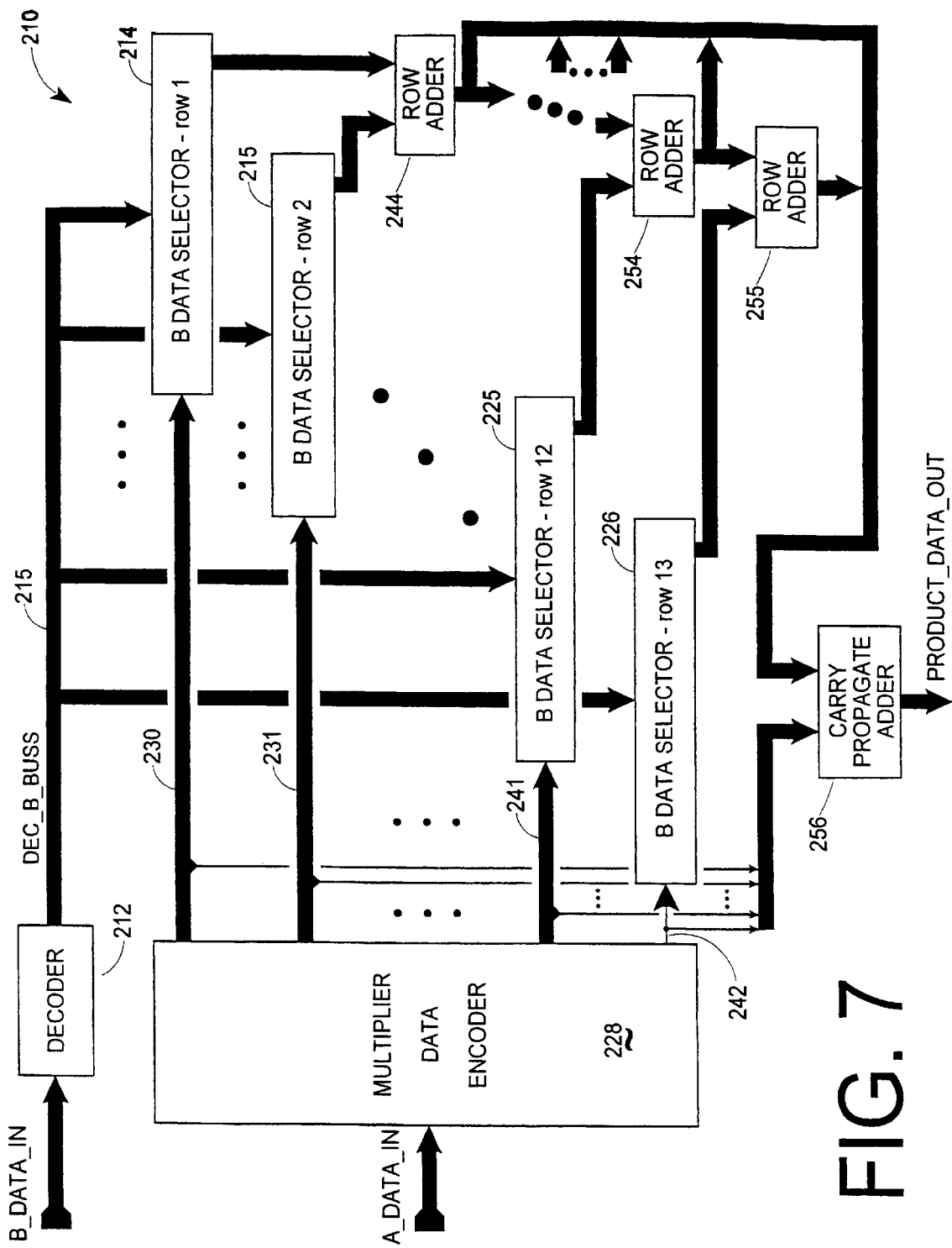
FIG. 7 is a block diagram of a 24 bit×24 bit multiplier according to the present invention.

FIG. 7 shows 24 bit×24 bit multiplier 210 according to the present invention. This embodiment is an extension of 8 bit×8 bit multiplier 10 of FIG. 1. 24 bit B_DATA_IN is decoded in decoder 212 to provide the true and complement of each data bit which is then connected to 13 B DATA SELECTOR circuits 214–226. 24 bit A_DATA_IN is encoded in MULTIPLIER DATA ENCODER 228 which produces outputs on 12 buses 230–241 plus an output on line 212. Outputs of selector circuits 214–226 are coupled into a series of 12 ROW ADDERS 244–255, the outputs of which passes into CARRY PROPAGATE ADDER 256 together with the X3 signal from buses 230–241 and line 242. The product of A and B, PRODUCT_DATA_OUT is at the output of adder 256.

Decoder 212 is an extension of decoder 14 of FIG. 2B with 24 input lines and 48 outputs.

Selector circuits 214–225 are an extension of selector circuits 16–19 shown in FIGS. 3A–3D. Selector circuits 214–225 each have 25 multiplexers of the type shown in FIG. 6C. In relation to FIG. 3A, for example, an additional 16 multiplexers can be thought of as inserted between multiplexers 51 and 52 and the associated signals (the numbers between the <and> symbols) for the additional multiplexers numbered incrementally. The associated signals for multiplexers 52 and 53 would increase by 16.

Selector circuit 226 is an extension of selector circuit 20 shown in FIG. 3E in that 16 additional 2 input multiplexers such as multiplexers 81–89 can be thought of as inserted between 2 input multiplexers 87 and 88 with input and output signals numbered incrementally. The signals associated with 2 input multiplexers 88 and 89 would be increased by 16, and signal X3<4> would become X3<13>.

MULTIPLIER DATA ENCODER 212 is an extension of MULTIPLIER DATA ENCODER 12 shown in FIG. 2A. Eight more encoder circuits of the type shown in FIG. 6A can be thought of as inserted between encoders 43 and 44 with input/output signals numbered incrementally. The signals associated with (the numbers between the <and> symbols) encoder 44 would be increased by 8.

ROW ADDERS 244–255 are an extension of the circuits shown in FIGS. 4A and 4B. Each of adders 244–255 have 16 additional adder circuits in addition to the nine adder circuits for each of the adders 28–31 shown in FIGS. 4A and 4B. Each of the 16 additional adder circuits are of a type shown in FIG. 6D and can be thought of as inserted between adder circuits 94 and 95 of adder 28, for example, with their associated signals numbered incrementally. The signals associated with adder circuits 95 and 96 would be increased by 16.

CARRY PROPAGATE ADDER 256 is an extension of CARRY PROPAGATE ADDER 36. 32 additional adder circuits of the type shown in FIG. 6D can be thought of as inserted between adder circuits 136 and 137 with their associated signals numbered incrementally. The signals associated with adder circuits 137 would be increased by 32.

Both 8 bit multiplier 10 and 24 bit multiplier 210 operate is the same manner as would be expected.

Figure 8A:
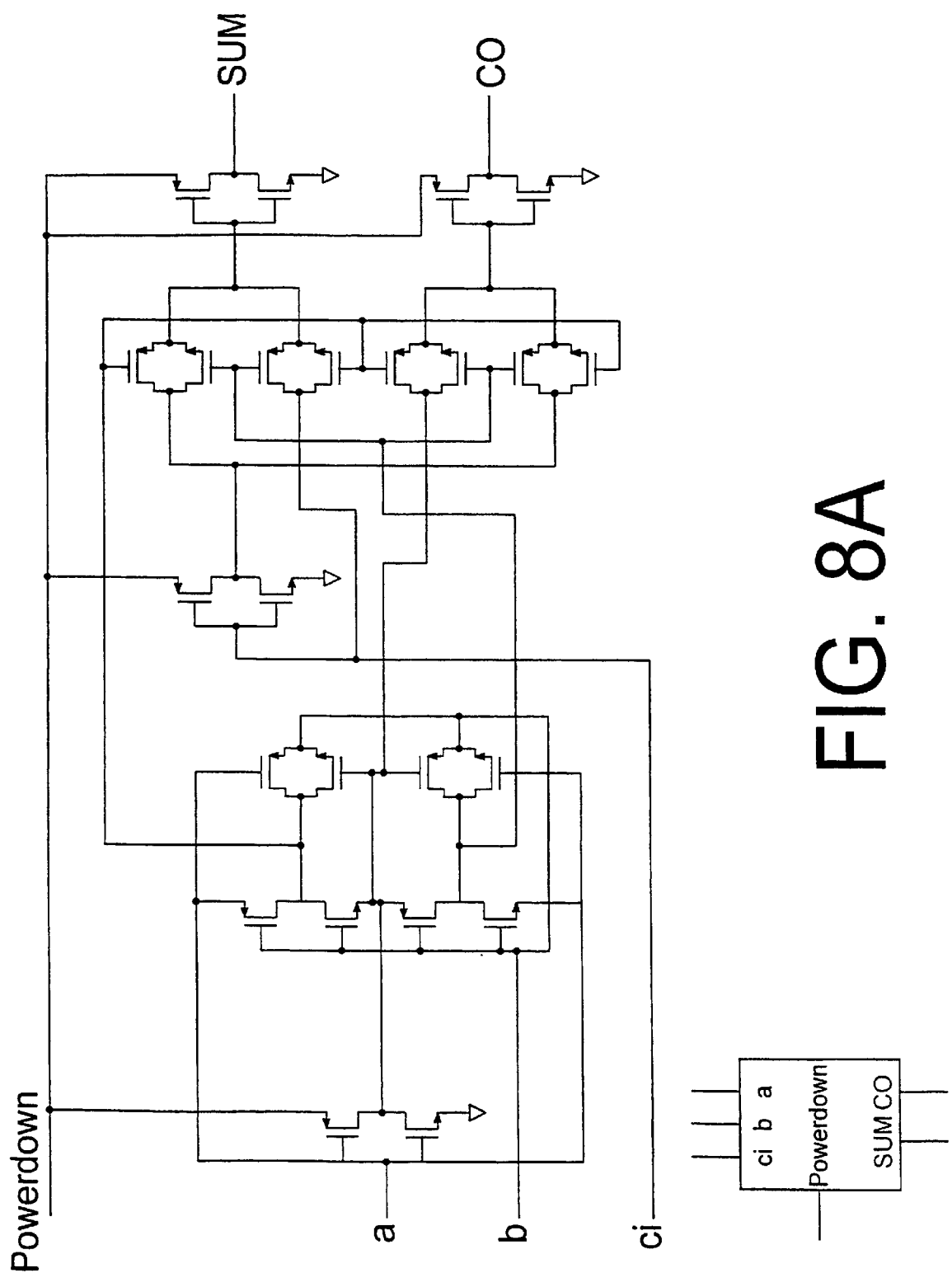
FIG. 8A is a schematic diagram on an alternative adder circuit to the circuit shown in FIG. 6D.

Multiplier 210 of FIG. 7 can be modified to advantageously save power in the multiplier. Adders 244–255 in the 24×24 bit multiplier 210 operate in a ripple manner in that a change in the input of the first adder 244 may cause a change in all of the following adders in a sequential manner. When a multiplication operation begins, adder 244 will have valid inputs to it when selector circuits 214 and 215 are stable, but adder 245 must wait for selector circuits 214–216 to be stable and for adder 244 to be stable before adder 245 can be stable. Since all of selector circuits 214–226 will usually be stable before adders 244–255 are stable, a power saving scheme is available by sequentially powering up adder circuits 244–255. Adder circuits 244–255 are therefore modified, as shown in FIG. 8A, to have their VDD inputs individually connected to a Powerdown signal.

Figure 8B:
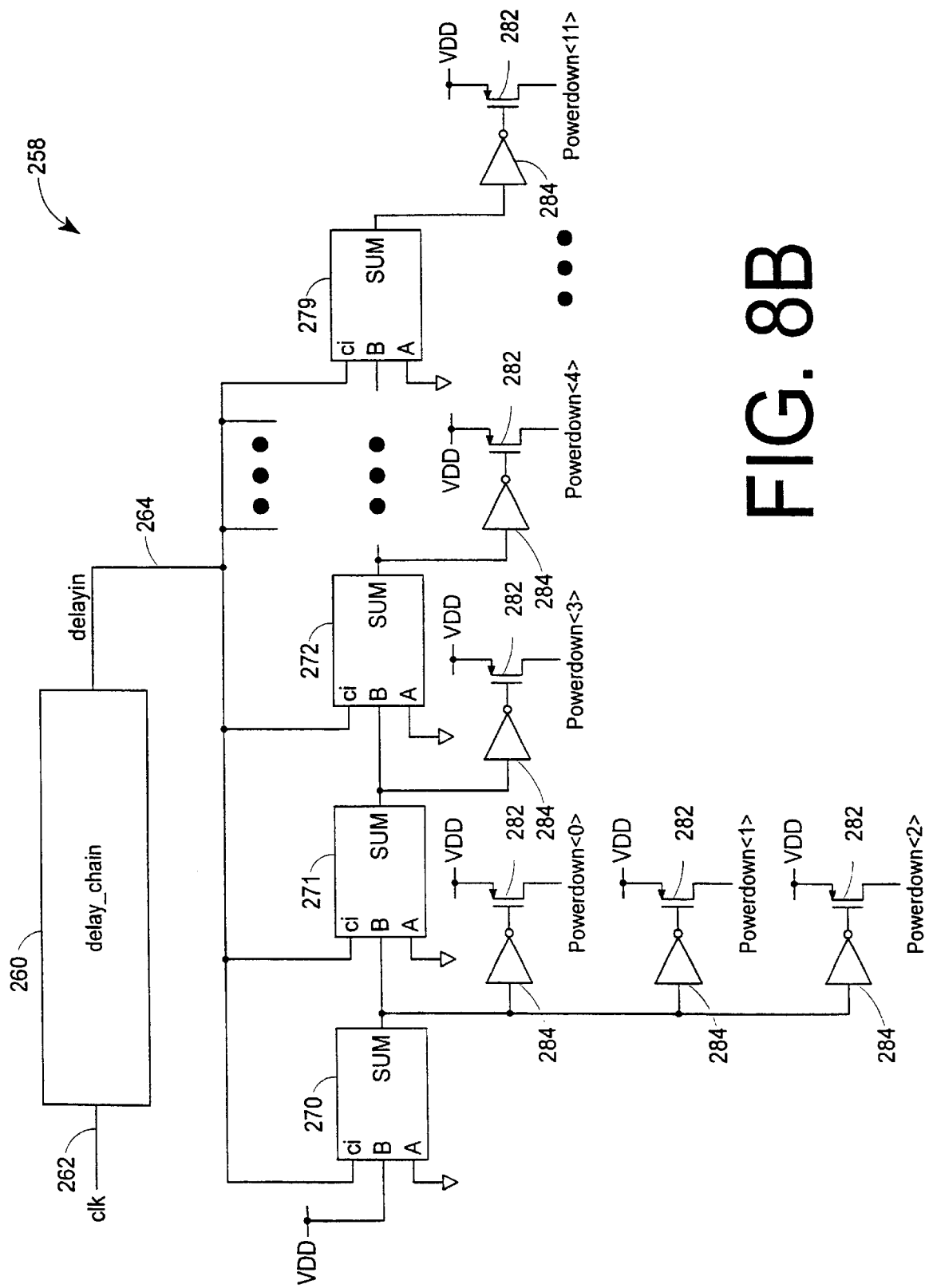
FIG. 8B is a partial block and partial schematic diagram of a circuit to provide power control to the adders of FIG. 8A.
Figure 8C:
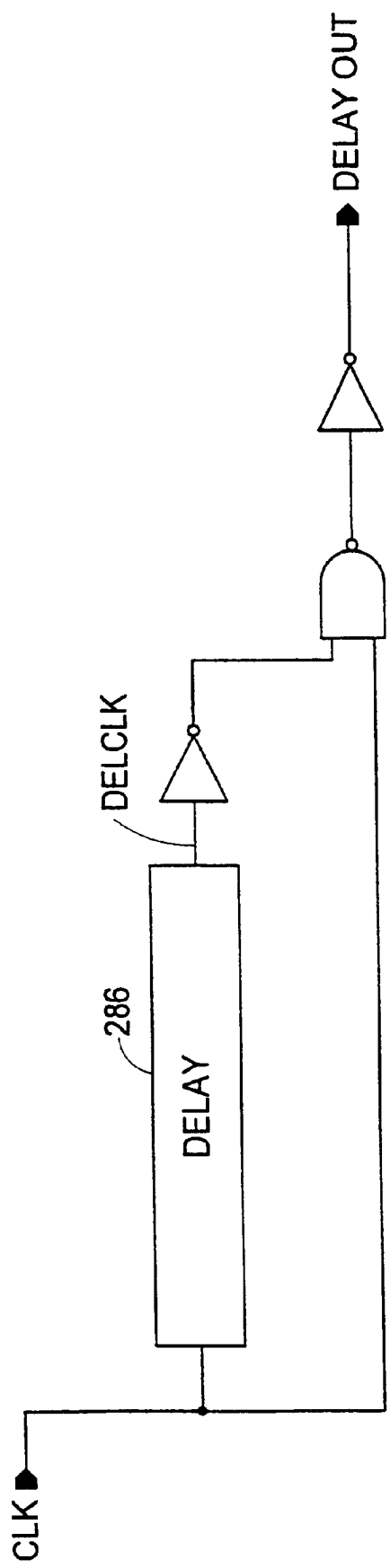
FIG. 8C is a logic diagram of the delay circuit shown in FIG. 8B.
Figure 8D:
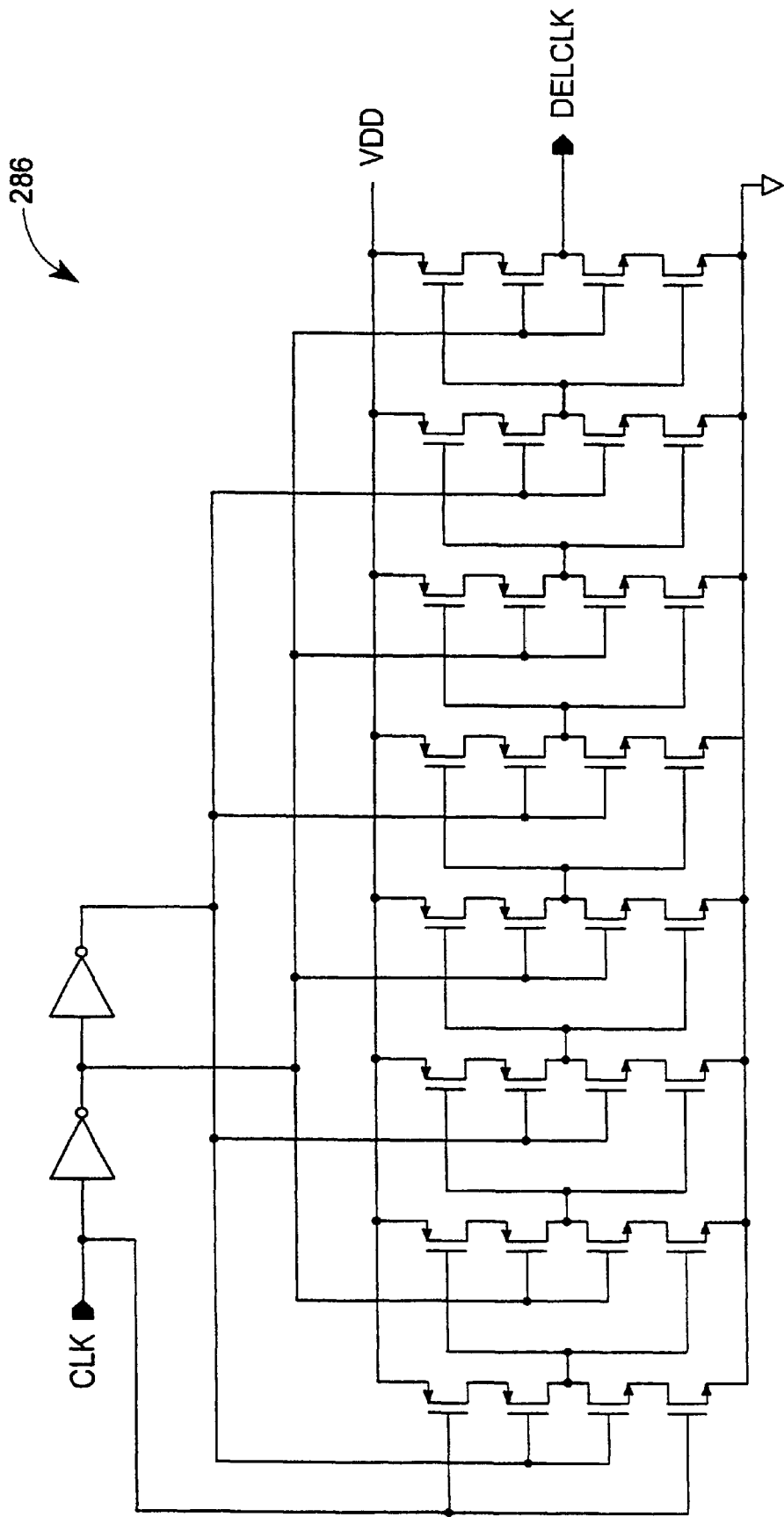
FIG. 8D is partial logic and partial schematic diagram of the DELAY circuit of FIG. 8C.

FIG. 8B shows a combination block diagram and circuit diagram 258 for generating the respective Powerdown signals Powerdown<0>–Powerdown<11> for adders 244–255. Clock input clk on line 262 is connected to the input of delay chain 260, which provides an output delayin on line 264. Delayin is connected to the carryin ci input of serially connected adders 270–279. These adders have their A inputs grounded and their B inputs connected to the output of the previous adder with the B input of adder 270 connected to VDD. Each adder output connects to a series combination of inverter 284 and the gate of transistor 282. Adder 270 has two additional inverter-transistor combinations such that when the output of adder 270 goes high, adders 244, 245, and 246 are powered up, with adders 247–255 powered up sequentially thereafter. FIG. 8C is a logic diagram of delay chain 260, and FIG. 8D is a logic and schematic diagram of DELAY circuit 286 of FIG. 8C.

The multiplication procedure according to the preferred embodiment includes the following: Given two numbers A and B to be multiplied, where A is the multiplier data and B is the multiplicand data, A is encoded or parsed two bits at a time starting with the least significant bit.

If A is an odd number of bits in length, then before the pairing of the bits a 0 is added to the left of the A data if A is unsigned or positive, or a 1 is added if A is negative. If A is an even number of bits in length, then before the pairing of the bits a 00 bit pair is added to the left of the A data if A is unsigned or positive, or a 11 bit pair is added if A is negative.

Since 3B is difficult to generate, an encoding scheme similar to that used by MacSorley in the article referenced above can be used. An example of this is as follows:

$$7 = 00111 = 010 0 \overline{1}$$

that is, 7 can be represented as 8−1. The main result of this is that 3B becomes −B with a +1 added to the next couple of bits encoded. Table 3 shows this encoding.

TABLE 3

New Encoding

| Cin | $A_{2i+1}$ | $A_{2i}$ | Operation | Cout |
|---|---|---|---|---|
| 0 | 0 | 0 | $R_i = (R_{i-1})/4 + Cout$ | 0 |
| 0 | 0 | 1 | $R_i = (R_{i-1} + B)/4 + Cout$ | 0 |
| 0 | 1 | 0 | $R_i = (R_{i-1} + 2B)/4 + Cout$ | 0 |
| 0 | 1 | 1 | $R_i = (R_{i-1} - B)/4 + Cout$ | 1 |
| 1 | 0 | 0 | $R_i = (R_{i-1} + B)/4 + Cout$ | 0 |
| 1 | 0 | 1 | $R_i = (R_{i-1} + 2B)/4 + Cout$ | 0 |
| 1 | 1 | 0 | $R_i = (R_{i-1} - B)/4 + Cout$ | 1 |
| 1 | 1 | 1 | $R_i = (R_{i-1})/4 + Cout$ | 1 |

Note that the only changes from the Kwentus encoding of Table 2 with respect to the first four rows of Table 3 occur in the fourth row of table 3 where 3B is encoded as −B and C is a 1 added to the next couple of encoded bits.

Sign Extension

The sign extension of the multiplier can be implemented using a sign extension scheme similar to single zero representation as shown by E. de Angel and Earl E. Swartzlander ("Low Power Parallel Multipliers," VLSI Signal Processing IX, pp. 199–210, 1996).

Shown below is a partial product diagram for an 8×8 multiplier with the correction required to generate the sign extension. T is the one's complement of the sign and D is the correction constant required to generate the negative partial products (i.e., D=1 if the row above it was encoded with a −B coefficient (also sometimes referred to as a scale factor), and D=0 if the row above it was formed using any other coefficient).

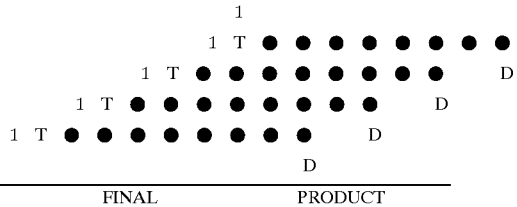

Diagram 1: SIGN EXTENSION

EXAMPLES

Below are three examples showing the multiplication process. Bold numbers show the implementation of the sign extension. De Angel (referenced above) shows in detail how the sign extension is implemented. A. Inoue, R. Ohe, S. Kashiwakura, S. Mitarai, T. Tsuru, T. Izawa and G. Goto ("A 4.1 ns Compact 54×54b Multiplier Utilizing Sign Select Booth Encoders," International Solid-State Circuits Conference, pp. 416–417, 1997) shows a reduction of the 5:1 multiplexer through merging adjacent multiplexers. This technique allows a ratio of 10 transistors per bit. In this architecture a plain implementation of the 4:1 multiplexer using pass transistor logic (as described in K. Yano, T. Yamanaka, T Nishida, M. Saito, K. Shimohigashi and A. Shimizu, "A 3.8 ns CMOS 16×16b Multiplier Using Complementary Pass-Transistor Logic," IEEE Journal of Solid-State Circuits, vol. 25, pp. 388–395, 1990) results in 7 transistors per bit.

Example 1:

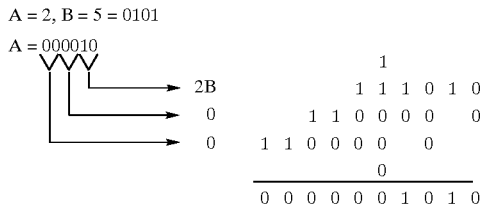

Example 2:

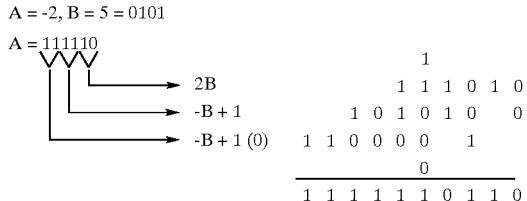

In the second example the middle pair of the A bits produced −B+1, that is, −B for the present row and a 1 to carry to the next most significant pair of A bits. The most significant pair of A bits by themselves also would decode as −B for the present row and 1 to carry to the next pair of more significant A bits if there were any. Since there are not any more significant bits, this carry is discarded. However, the most significant pair of A bits (11) has a 1 bit carried in from the previous pair of A bits, and therefore decodes as (00) which is all zeros for the four data bits and two 1 bits for the sign bits.

Example 3:

```
A = 109, B = 5 = 0101
A = 0001101101
```
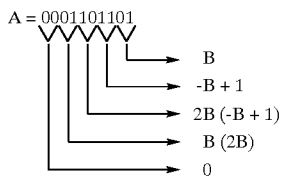
```
         B                      1 1 0 0 0 0 0 1 0 1
         -B + 1               1 0 1 1 1 1 1 0 1 0   0
         2B (-B + 1)        1 0 1 1 1 1 1 0 1 0   1
         B (2B)         1 1 0 0 0 0 1 0 1 0   1
         0        1 1 0 0 0 0 0 0 0 0   0
                                                    0
         ─────────────────────────────────────────────
         0 0 0 0 0 0 0 0 1 0 0 0 1 0 0 0 0 1
```

The third example is an 8×8 multiplication, and the carry operation in the Booth encoding occurs two times.

In comparison to the conventional prior art Booth multiplier discussed in the above BACKGROUND OF THE INVENTION, a multiplier using the present invention does not use 5:1 multiplexers, but 4:1 multiplexers, and with the consequential savings in chip area comes an improvement in speed of the multiplier.

Although the invention has been described in part by making detailed reference to a certain specific embodiment, such detail is intended to be, and will be understood to be, instructional rather than restrictive. It will be appreciated by those skilled in the art that many variations may be made on the structure and mode of operation without departing from the spirit and scope of the invention as disclosed in the teachings contained herein. For example the CARRY PROPAGATE ADDER 36, shown as standard ripple adder, could be replaced with a fast adder to improve the performance of the digital multiplier 10. Also, if the speed of the digital multiplier 10 is not critical, it would be possible to multiplex at least part of the B DATA SELECTORS 16–20, the adders 28–31 and 36, and/or the MULTIPLIER DATA ENCODER circuits 40–44 and thereby reduce the area required for the multiplier 10.

What is claimed is:

1. A method for multiplying a multiplicand by a multiplier comprising the steps of:
    a) parsing the multiplier into a first plurality of groups of preselected bits of the multiplier and providing a corresponding first plurality of scale factors;
    b) scaling the multiplicand by each of said scale factors to provide a first plurality of scaled multiplicands;
    c) adding said first plurality of scaled multiplicands together in an adder, said adder comprising a second plurality of adder circuits wherein each of said second plurality of adder circuits has a third plurality of inputs, said third plurality being greater than the number of data bits of any of said first plurality of scaled multiplicands, and wherein said second plurality of adder circuits comprises a fourth plurality of adder circuits and a fifth plurality of adder circuits, said adding step comprising the steps of:
        i) applying power to said fourth plurality of adder circuits at the same time and,
        ii) applying power to each of said fifth plurality of adder circuits at a fifth plurality of different times such that the number of intermediate states in said second plurality of adder circuits is less than if all of said second plurality of adder circuits were powered at the same time.

2. The method set forth in claim 1 further including the step of applying power to one of said fifth plurality of adder circuits at the same time that power is applied to said fourth plurality of adder circuits.

3. The method set forth in claim 1 further including the step of providing a timer which controls said sequential powering of said fifth plurality of adder circuits in response to a single input signal.

4. A method for multiplying a multiplicand by a multiplier comprising the steps of:
    a) parsing the multiplicand into a first plurality of groups of preselected bits of the multiplicand and providing a corresponding first plurality of scale factors;
    b) scaling the multiplier by each of said scale factors to provide a first plurality of scaled multipliers;
    c) adding said first plurality of scaled multipliers together in a second plurality of adders and controlling the time that power is applied to said second plurality of adders such that at least two adders are powered prior to the start of a multiplication operation, and after said start of said multiplication operation, sequentially powering each of a third plurality of adders such that the number of intermediate states in said third plurality of adders is less than if all of said second plurality of adders were powered at the same time.

5. The method set forth in claim 4 further including the step of powering at least three of said first plurality of adders prior to said start of said multiplication operation.

6. The method set forth in claim 4 further including the step of providing a timer which controls said sequential powering of said third plurality of adders in response to a single input signal.

7. A multiplier for multiplying multiplicand data by signed multiplier data to provide quotient data, said multiplier comprising:
    a) an encoder for grouping said multiplier data and for assigning coefficients to each of said groups;
    b) a plurality of data selectors coupled to said multiplicand data and to one of said assigned coefficients and providing the product of one of said coefficients times a copy of said multiplicand data; and
    c) means for summing coupled to said plurality of registers and providing said quotient data, wherein said means for summing comprises first and second groups of adders, said first group receiving power supply voltage when said a multiplication operation begins, and said second group of adders receiving power supply voltage at a time subsequent to when said first group of adders receives power supply voltage.

8. A method for reducing power in a digital multiplier when said multiplier in successive multiplication operations with identical multiplicand and multiplier data comprising the steps of:

a) encoding said multiplier in CMOS circuitry to provide a first plurality of coefficients;

b) for each of said coefficients multiplying said multiplicand by said respective coefficient to provide a multiplied multiplicand;

c) adding said multiplied multiplicands in a second plurality of adders; and d) providing power supply voltage to a first set of said adders when said a multiplication operation begins, and providing power supply voltage to a said second set of said adders at a time subsequent to when said first set of adders receives power supply voltage.

* * * * *